United States Patent

Mori et al.

Patent Number: 5,440,420
Date of Patent: Aug. 8, 1995

[54] OPTICAL AMPLIFIER

[75] Inventors: Tsuneo Mori; Kazuo Koya, both of Gunma, Japan

[73] Assignee: Shin-Etsu Chemical Co., Ltd., Tokyo, Japan

[21] Appl. No.: 186,294

[22] Filed: Jan. 25, 1994

[30] Foreign Application Priority Data

Jan. 27, 1993 [JP] Japan .................. 5-011941

[51] Int. Cl.⁶ .................................................. H01S 3/30
[52] U.S. Cl. ............................................................ 359/341
[58] Field of Search .................. 359/341; 385/95, 96

[56] References Cited

U.S. PATENT DOCUMENTS

| | | | |
|---|---|---|---|
| 4,442,122 | 2/1991 | Ragit | 350/96.15 |
| 4,801,185 | 1/1989 | Bricheno | 350/46.15 |
| 4,923,268 | 5/1990 | Xu | 350/96.15 |
| 5,171,345 | 12/1992 | Takemura | 385/96 X |
| 5,280,383 | 1/1994 | Federici et al. | 359/341 |
| 5,309,536 | 5/1994 | Saganuma et al. | 385/96 X |

*Primary Examiner*—Mark Hellner
*Attorney, Agent, or Firm*—McAulay Fisher Nissen Goldberg & Kiel

[57] ABSTRACT

Herein disclosed is an optical amplifier which permits sufficient reduction of light-transmission loss when it is incorporated into an optical communication system as a part thereof. The optical amplifier comprises an optical fiber 8 for amplification having a length sufficient for stimulated emission through excitation by an excitation laser beam and sufficient for amplifying a transmitted laser beam; an optical fiber 17 for transmission; and an optical wavelength division multiplexer 6 formed by partially fusing, under drawing conditions, the optical fibers 8 and 17 at a portion in the proximity to the light-incident end of the fiber 8 for amplification. The optical amplifier comprises the optical wavelength division multiplexer 6 formed from a part of the optical fiber 8 for amplification and, therefore, permits substantial reduction in the number of fused portions required for the connection thereof to an optical communication system upon incorporation thereof into the system. For this reason, the connection loss of light can substantially be reduced and accordingly the overall efficiency for amplification is substantially increased.

5 Claims, 4 Drawing Sheets

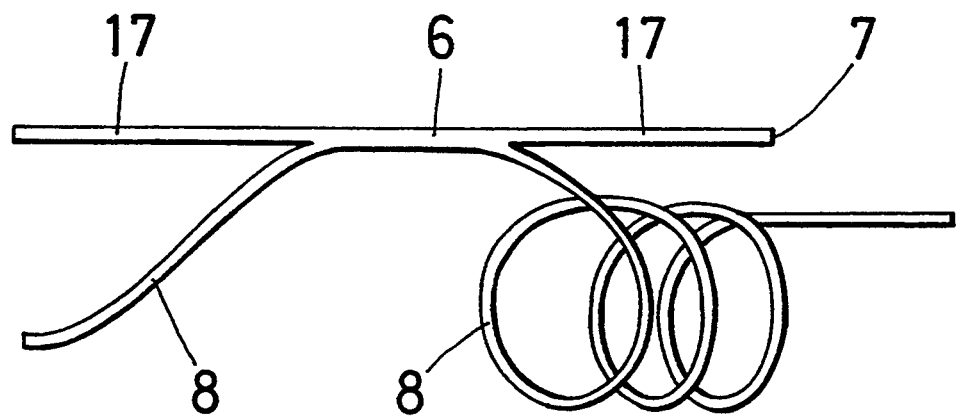
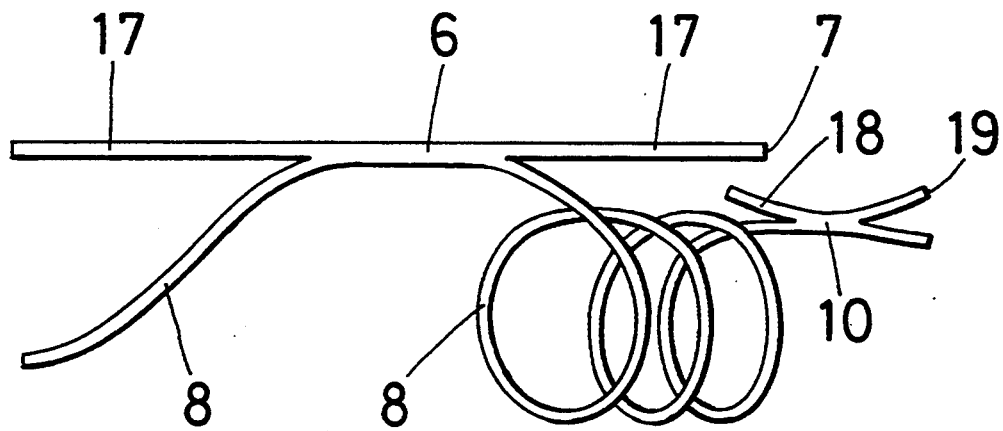

FIG. 7
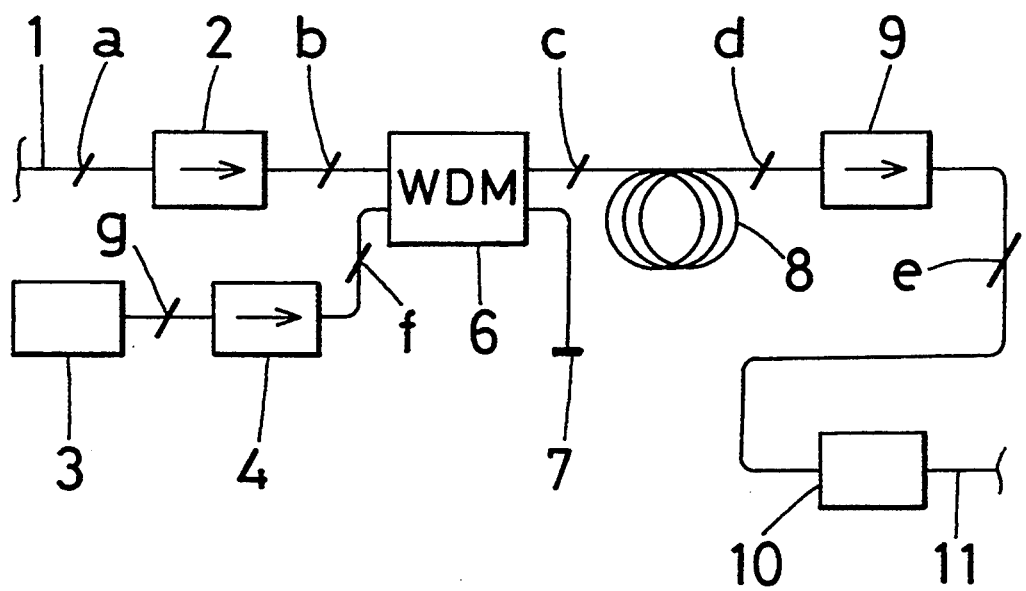
FIG. 8  WDM6
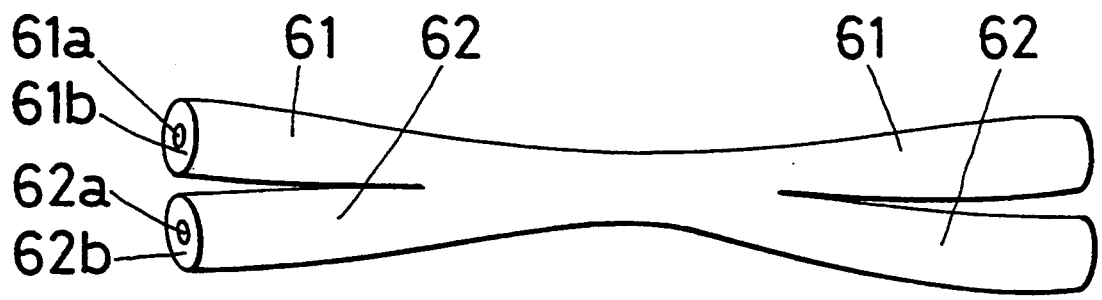

OPTICAL AMPLIFIER

BACKGROUND OF THE INVENTION

The present invention relates to an optical amplifier which forms a part of an optical communication system.

Recently, the optical communication system which makes use of an optical fiber has increasingly been developed because of its low induced noise and it's ability of long-distance transmission as compared with the system which makes use of a metallic transmission line. In addition, an amplifier is arranged in the middle of the transmission line for the achievement of more longer distance transmission. Conventionally, a signal laser beam has once been converted into an electric signal to electrically amplify the laser beam and then the electric signal has been used for generating a laser beam to thus give an amplified laser beam, but it is a recent tendency to use an optical amplifier for the purpose of preventing such reduction in efficiency due to the amplification of an optical signal through conversion thereof into an electric signal.

Among optical amplifiers, it is particularly effective to use an optical fiber for amplification if it is arranged in the middle of a transmission line for the optical communication. The optical fiber for amplification is a fiber comprising a core portion to which a rare earth element such as erbium is added. A signal laser beam which is guided to and passes through the optical fiber is directly amplified through the stimulated emission of the rare earth element which receives an energy emitted from a laser for excitation.

The use of an amplifying system as shown in FIG. 7 is required for inserting an amplification optical fiber of this type into the transmission line of an optical communication system. As seen from FIG. 7, an optical fiber 1 for transmission is connected to a wavelength division multiplexer 6 at the light-incident side thereof through an optical isolator 2. Moreover, a laser 3 for excitation is also connected to another position on the light incident side of the wavelength division multiplexer 6 through an optical isolator 4. On the other hand, an optical fiber 8 for amplification is connected to the wavelength division multiplexer 6 at its light-outgoing side. In this respect, another end face of the wavelength division multiplexer 6 at the light-outgoing side is subjected to an anti-reflection treatment 7. The optical fiber 8 for amplification is connected to an optical isolator 9 at its light-outgoing side and the optical isolator 9 is connected to an optical fiber 11 for transmission, at its light-outgoing side, through a band-pass filter 10.

Each of the optical fibers 1 and 11 for transmission is a single mode fiber capable of transmitting a signal laser beam falling within a band having a wave length λ of 1.55 μm and only a part of the overall length thereof is depicted on FIG. 4. The optical isolator 2 comprises a polarizer, a Faraday rotator and analyzer and serves to prevent the light incident upon the optical fiber 1 for transmission from being returned to the optical fiber 1 through surface-reflection by the light-incident face of the wavelength division multiplexer 6. Each of the optical isolators 4 and 9 has a structure identical to that of the isolator 2. The laser 3 for excitation serves as a source for oscillating an excitation laser beam having a wave length λ of 1.48 μm. The amplifying optical fiber 8 is an optical fiber obtained by adding erbium to the core portion thereof. The wavelength division multiplexer 6 can be prepared by heating and fusing two optical fibers 61 and 62 which are superimposed to one another while drawing the heated and fused fibers. These fibers 61 and 62 each comprises a core portion 61a or 62a and a clad portion 61b or 62b. The fiber 61 is a currently used single mode fiber for transmission like the optical fibers 1 and 11 for transmission, while erbium is added to the core portion of the fiber 62, as in the case of the optical fiber 8 for amplification. The band-pass filter 10 is a selective transmission type optical filter capable of transmitting only the band peak having a wave length λ of 1.55 μm.

In the amplification system shown in FIG. 7, a signal laser beam (wave length λ=1.55 μm) transmitted through the optical fiber 1 for transmission is incident upon the wavelength division multiplexer 6 through the optical isolator 2. Moreover, a laser beam (wave length λ=1.48 μm) for excitation oscillated from the excitation laser 3 is incident upon the wavelength division multiplexer 6 in which the laser beam is multiplexed with the signal laser beam and the multiplexed laser beam is then incident upon the optical fiber 8 for amplification. The signal laser beam is amplified through the stimulated emission of the erbium which is excited by the laser beam for excitation during the passage of the signal laser beam and the laser beam for excitation through the optical fiber 8 for amplification. The signal laser beam thus amplified is incident upon the band-pass filter 10 through the optical isolator 9, the band-pass filter 10 cuts off light rays of unnecessary wave lengths (mainly comprising those having a wave length λ of 1.48 μm) to thus allow the passage of only the signal laser beam (having wave length λ of 1.55 μm) and the amplified signal laser beam is further transmitted through the optical fiber 11 for transmission.

The aforementioned amplification system which makes use of the optical fiber for amplification has a markedly improved efficiency as compared with the conventional system in which a signal laser beam is once electrically amplified through the photoelectric conversion and then the resulting electric signal serves to oscillate an amplified laser beam, but it is needed to fuse the end faces of optical fibers in order to eliminate any loss at joined portions each formed between neighboring two optical elements. In FIG. 7, these joined portions each formed between neighboring two elements fused together are denoted by symbols a to g. Even if the joined portions are fused, the propagation loss is inevitably caused at such joined portions and accordingly, it has become an important technical subject in this field to reduce the propagation loss as low as possible from the viewpoint of the overall degree of amplification. Japanese Patent Provisional Publication No. 4-67130 discloses a technique for approximately coinciding the mode field of a fiber with that of another fiber to be joined by heating the fused and joined portion to thus diffuse the dopant present in the core region of the fibers. However, this technique is still incomplete and a finite degree of propagation loss is still observed in such a fused portion.

SUMMARY OF THE INVENTION

The present invention has been developed for solving the foregoing problems associated with the conventional techniques and it is an object of the present invention to provide an optical amplifier which permits a sufficient decrease in the propagation loss when it is incorporated into an optical communication system as a part thereof.

The optical amplifier according to the present invention which allows the achievement of the foregoing object will hereunder be described with reference to the accompanying drawings which correspond to embodiments of the present invention.

The optical amplifier according to the present invention is one serving as a part of an optical communication system and comprises, as shown in FIG. 1, an optical fiber 8 for amplification having a length sufficient for inducing stimulated emission through excitation by a laser beam for excitation and sufficient for amplifying a transmitted laser beam; an optical fiber 17 for transmission; and an optical wavelength division multiplexer 6 formed by fusing, under drawing conditions, the optical fibers 8 and 17 at a portion situating in the proximity to the end of incidence.

In addition, the optical amplifier according to the present invention preferably comprises, as shown in FIG. 2, an optical filter 10 positioned in the proximity to the light-outgoing end of the optical fiber 8 of the optical amplifier shown in FIG. 1 and formed by fusing, under drawing conditions, the optical fiber 8 with an optical fiber 18 having a propagation constant identical to that observed for the optical fiber 8 as determined at the same wave length, in addition to the foregoing elements shown in FIG. 1.

When the optical amplifier according to the present invention is incorporated into an optical communication system, the light-outgoing end of the optical fiber 8 for amplification is preferably inline-connected to the optical isolator 9 on its light-incident side, as shown in FIGS. 3 and 4.

The end of incidence of the optical fiber 17 for transmission is preferably inline-connected to the optical isolator 2 on its light-outgoing side, likewise shown in FIGS. 3 and 4.

More preferably, the light-outgoing end of the optical fiber 8 for amplification is inline-connected to the optical isolator 9 on its light incident side and simultaneously the end of incidence of the optical fiber 17 for transmission is inline-connected to the optical isolator 2 on its light-outgoing side.

In the optical amplifier according to the present invention, the optical fiber 17 for transmission may be incorporated into an optical communication system as a long-distance transmission path, as will be seen from FIGS. 5 and 6.

BRIEF DESCRIPTION OF THE DRAWINGS

FIG. 1 is a diagram showing an embodiment of the optical amplifier according to the present invention;

FIG. 2 is a diagram showing another embodiment of the optical amplifier according to the present invention;

FIG. 7 is a diagram showing the optical communication system which is provided with a conventional optical amplifier incorporated therein;

FIG. 8 is a diagram showing an example of the structure of a wavelength division multiplexer.

DETAILED EXPLANATION OF THE INVENTION

Figure 3:
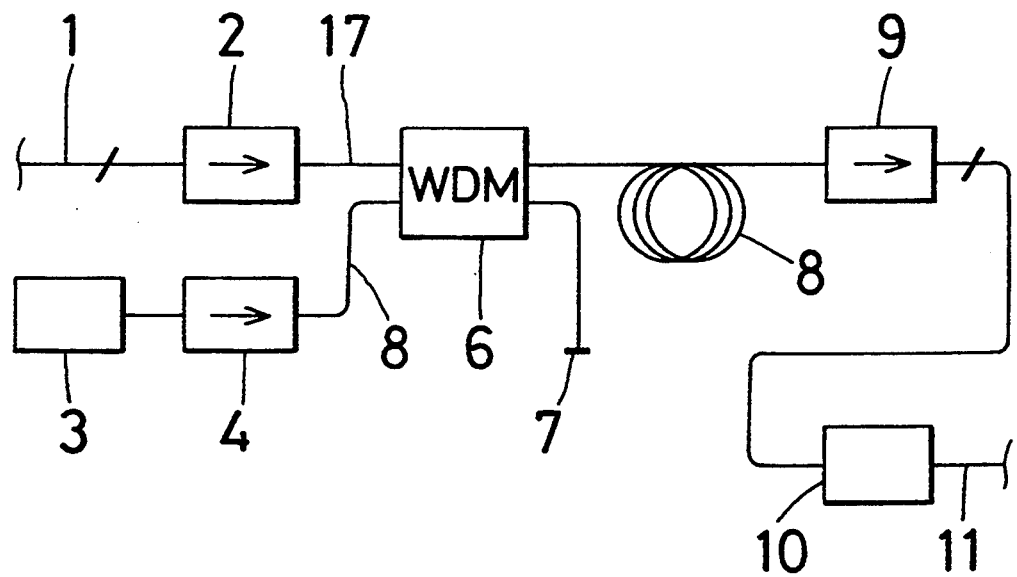
FIG. 3 is a diagram showing an embodiment of the optical communication system which is provided with the optical amplifier according to the present invention incorporated therein.

Various embodiments of the optical amplifier according to the present invention will be detailed below with reference to the accompanying drawings, but the present invention is not restricted to these specific embodiments. In the foregoing attached figures, all the structural features, which are identical to one another, bear the same reference numeral.

FIG. 1 shows an embodiment of the optical amplifier according to the present invention. The optical amplifier of this embodiment can be produced as follows. First of all, two kinds of optical fibers are provided. One of them is a single mode fiber capable of transmitting light rays having a wave length $\lambda$ of 1.55 $\mu$m, has an outer diameter of 125 $\mu$m, a core diameter of 9 $\mu$m and an overall length of 2 m and is used as an optical fiber 17 for transmitting light rays (or beams). The other of them is the same optical fiber used for the fiber 8 except that erbium is added to the core portion thereof and that the entire length thereof is 50 m. Parts of the covers of these optical fibers 17 and 8 are removed at the position situating about 1 m away from the ends, superimposed to one another and fused and drawn under heating with an oxyhydrogen flame. A wavelength division multiplexer 6 is formed through this fusion and drawing treatments. The conditions for the fusion and drawing treatments are selected in such a manner that the multiplexing rate of the optical fibers 17 and 8 in the wavelength division multiplexer 6 is 5:95 as determined at a wave length of 1.48 $\mu$m and 95:5 as determined at a wave length of 1.55 $\mu$m. Thus, the wavelength division multiplexer 6 as shown in FIG. 1 is formed at the position 1 m away from the ends of incidence of the optical fiber 17 for transmission and the optical fiber 8 for amplification and correspondingly an optical amplifier is completed, which accordingly comprises the wavelength division multiplexer 6, a zone for induced emission, i.e., the remaining amplifying-optical fiber 8 having a length of 49 m and an outgoing end. In this connection, the end face of the optical fiber 17 for transmission on the light-outgoing side is subjected to anti-reflection treatment 7.

The optical amplifier can be incorporated, in the following manner, into an optical communication system as shown in FIG. 3 as a part thereof. The light-incident end of the optical fiber 17 in the optical amplifier is inline-connected to an optical isolator 2 on the light-outgoing side thereof and the optical fiber on the light-incident side of the optical isolator 2 is fused together with an optical fiber 1 for transmission. Moreover, the light-outgoing end of the optical fiber 8 is inline-connected to an optical isolator 9 on the light-incident side of the latter, the optical fiber on the light-outgoing side of the optical isolator 9 is connected to an optical band pass filter 10 and the band pass filter 10 is, in turn, connected to an optical fiber 11 for transmission. Further the light-incident end of the optical fiber 8 for amplification is inline-connected to an optical isolator 4 on the light-outgoing side of the isolator 4 and a pigtail of an optical fiber for an excitation laser 3 is inline-connected to the optical isolator 4 on the light-incident side of the latter. The excitation laser 3 is a laser diode capable of oscillating or emitting a light beam having a wave length of 1.48 μm.

FIG. 2 shows another embodiment of the optical amplifier according to the present invention. The optical amplifier of this embodiment comprises an optical fiber 17 for transmission whose light-outgoing end is treated in the same manner used for the production of the optical amplifier shown in FIG. 1; an optical fiber 8 for amplification including a zone for induced emission; a wavelength division multiplexer 6 formed from the optical fiber 17 for transmission and the optical fiber 8 for amplification in the vicinity of the light-incident ends of these optical fibers; and an optical filter 10 formed in the proximity to the light-outgoing end of the optical fiber 8 for amplification in the form of a fiber branching filter. The optical filter 10 is a selective transmission type band pass filter and can be produced in the same manner used for the production of the wavelength division multiplexer 6, i.e., by fusing, under drawing conditions, the optical fiber 8 for amplification and an optical fiber 18 having a propagation constant identical to that observed for the fiber 8, as determined at the same wave length. More specifically, the sheath is removed from the optical fiber 8 for amplification at a position about 1 m apart from the light-outgoing end thereof, the sheath is likewise removed from the optical fiber 18 having a propagation constant identical to that of the fiber 8 ($\beta$1) as determined at a wave length of 1.55 μm (but, the core portion thereof is free of erbium), then these optical fibers are superimposed at the exposed portions and fused and drawing while heating them with an oxyhydrogen flame. This drawing and fusion treatments allow the formation of a fiber branching filter (optical filter 10). The conditions for the drawing and fusion treatments are selected in such a manner that the band width of wave length range of transmitting light rays is set at 8 nm when the transmittance of the fibers is reduced to half (equal to a change of about 3 dB). In this way, the optical filter 10 has a band width of the transmitting light rays suitable for the transmission of a propagating light falling within the band having a wave length of 1.55 μm. Incidentally, the end 19 of the optical fiber 18 is subjected to an anti-reflection treatment.

Figure 4:
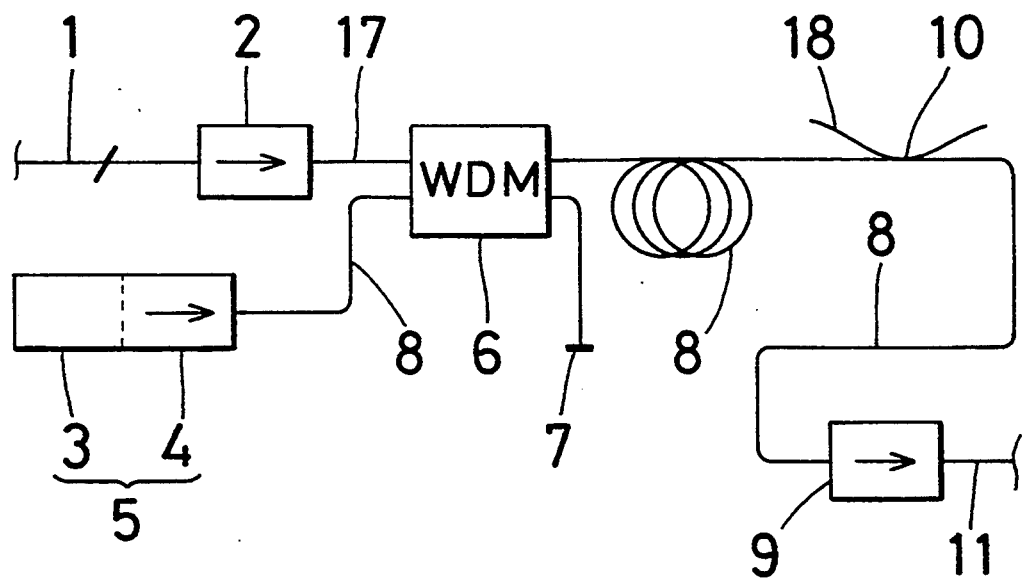
FIG. 4 is a diagram showing another embodiment of the optical communication system which is provided with the optical amplifier according to the present invention incorporated therein.

The optical amplifier shown in FIG. 2 can be incorporated, in the following manner, into an optical communication system as shown in FIG. 4, as a part thereof. The light-incident end of the optical fiber 17 in the optical amplifier is inline-connected to an optical isolator 2 on the light-outgoing side thereof and an optical fiber on the light-incident side of the optical isolator 2 is fused to an optical fiber 1 for transmission. Moreover, the light-outgoing end of the fiber 8 for light-amplification is inline-connected to an optical isolator 9 on its light-incident side and an optical fiber 11 for transmission is inline-connected to the optical isolator 9 on its light-outgoing side. Moreover, the incident end of the fiber 8 for light-amplification is inline-connected to the light-outgoing side of a module part 5 which comprises an excitation laser 3 and an optical isolator 4 integrated together.

Figure 5:
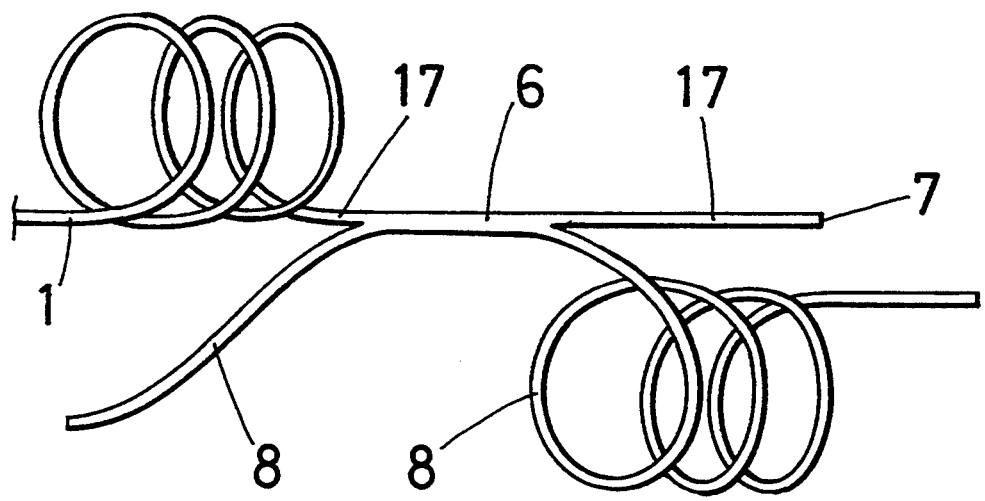
FIG. 5 is a diagram illustrating a still further embodiment of the optical amplifier according to the present invention.

FIG. 5 shows a still another embodiment of the optical amplifier according to the present invention. In the optical amplifier according to this embodiment, an optical fiber 17 for transmission constitutes an optical fiber 1 which serves as a long-distance propagation path for an optical communication system.

Figure 6:
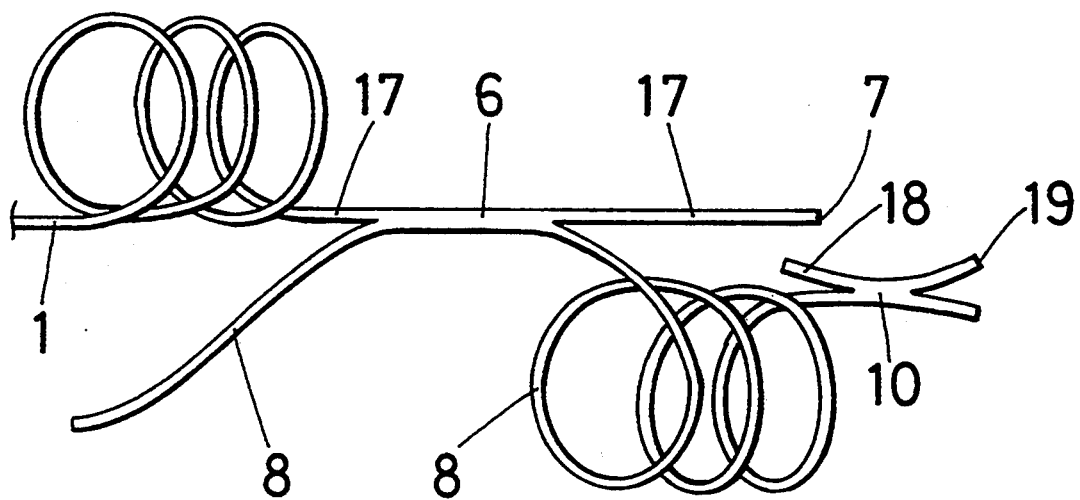
FIG. 6 is a diagram illustrating a still another embodiment of the optical amplifier according to the present invention.

FIG. 6 shows a still further embodiment of the optical amplifier according to the present invention. In the optical amplifier according to this embodiment, an optical fiber 17 for transmission constitutes an optical fiber 1 which serves as a long-distance propagation path for an optical communication system and an optical filter 10 is formed at a position in the vicinity of the light-outgoing end of the fiber 8 for light-amplification, in the form of a fiber branching filter.

As has been described above in detail, the optical amplifier according-to the present invention comprises an optical wavelength division multiplexer formed from a part of an optical fiber for amplification and, therefore, permits substantial reduction in the number of fused portions required for the connection thereof to an optical communication system upon incorporation thereof into the system. Moreover, an optical filter is also formed from a part of the optical fiber for amplification and correspondingly, the number of portions to be fused for connection can further be reduced. For this reason, the connection loss of light can be reduced and accordingly the overall efficiency for amplification is substantially increased.

What is claimed is:

1. An optical amplifier which serves as a part of an optical communication system, comprising an optical fiber for amplification having a length sufficient for stimulated emission through excitation by an excitation laser beam and sufficient for amplifying a transmitted laser beam; and optical fiber for transmission; and an optical wavelength division multiplexer formed by partially fusing, under drawing conditions, the optical fiber for amplification and the optical fiber for transmission at a portion in the proximity to the light-incident end of the fiber for amplification; and an optical filter arranged at a position in the proximity to the light-outgoing end of the optical fiber for amplification, which is formed by partially fusing, under drawing conditions, the optical fiber for amplification with an optical fiber having a propagation constant identical to that observed for the optical fiber for amplification as determined at a predetermined wave length.

2. The optical amplifier according to claim 1 wherein the light-outgoing end of the optical fiber for amplification is inline-connected to an optical isolator on the light-incident side of the isolator.

3. The optical amplifier according to claim 1 wherein the light-incident end of the optical fiber for transmission is inline-connected to another optical isolator on the light-outgoing side of the isolator.

4. The optical amplifier according to claim 1 wherein the light-outgoing end of the optical fiber for amplification is inline-connected to an optical isolator on the light incident side of the isolator and simultaneously the light-incidence end of the optical fiber for transmission is inline-connected to another optical isolator on the light-outgoing side of the isolator.

5. The optical amplifier according to claim 1 wherein the optical fiber for transmission is incorporated into an optical communication system as a long-distance transmission path.

* * * * *